US005609300A

United States Patent [19]
Conatser

[11] Patent Number: 5,609,300
[45] Date of Patent: Mar. 11, 1997

[54] AIRLESS PAINT SPRAYER OUTLET CHECK VALVE

[75] Inventor: Roger Conatser, Franklin, Tenn.

[73] Assignee: Campbell Hausfeld/Scott Fetzer Company, Westlake, Ohio

[21] Appl. No.: 417,096

[22] Filed: Apr. 5, 1995

Related U.S. Application Data

[63] Continuation-in-part of Ser. No. 370,159, Jan. 9, 1995.

[51] Int. Cl.$^6$ ....................................................... B05B 9/04
[52] U.S. Cl. .............................................. 239/332; 239/570
[58] Field of Search ................................... 239/330–333, 239/526, 570, DIG. 14, 146; 222/333; 137/511; 417/555

[56] References Cited

U.S. PATENT DOCUMENTS

| | | |
|---|---|---|
| 587,704 | 8/1897 | Clayton . |
| 716,864 | 12/1902 | Casey et al. . |
| 731,218 | 6/1903 | Perkins . |
| 754,162 | 3/1904 | Reynolds . |
| 827,522 | 7/1906 | Felsberg . |
| 1,169,587 | 1/1916 | Wold . |
| 1,272,212 | 7/1918 | Callan . |
| 1,592,373 | 7/1926 | Lovejoy . |
| 1,688,237 | 10/1928 | Joncha ................................. 417/559 X |
| 1,739,603 | 12/1929 | McCune . |
| 1,742,755 | 1/1930 | Cataline et al. . |
| 1,768,807 | 7/1930 | Thompson . |
| 1,808,209 | 6/1931 | Earl . |
| 1,969,205 | 8/1934 | Carr et al. . |
| 2,059,706 | 11/1936 | Paasche . |
| 2,266,365 | 12/1941 | Harrison et al. . |
| 2,371,546 | 3/1945 | Roselund . |
| 2,418,674 | 4/1947 | Steiner . |
| 2,634,885 | 4/1953 | North ................................. 222/333 X |
| 2,650,579 | 9/1953 | Bernight . |
| 2,669,245 | 2/1954 | Walker . |
| 2,679,258 | 5/1954 | Jackson . |
| 2,801,133 | 7/1957 | Ridley . |
| 2,839,076 | 6/1958 | Mueller . |
| 3,007,647 | 11/1961 | Woelfer ................................. 137/511 X |
| 3,120,347 | 2/1964 | Duke ................................. 239/333 X |
| 3,158,351 | 11/1964 | Kauffman et al. . |
| 3,253,611 | 5/1966 | Cummins . |
| 3,460,805 | 8/1969 | Kudlaty . |
| 3,687,154 | 8/1972 | Petersen et al. . |
| 3,698,415 | 10/1972 | Forster et al. . |
| 3,753,642 | 8/1973 | Lamoureux ................................. 239/570 X |
| 3,862,751 | 1/1975 | Schwaller . |
| 3,895,647 | 7/1975 | Willenbreck et al. . |
| 3,914,528 | 10/1975 | Johnson . |
| 4,221,437 | 9/1980 | Doerfler . |
| 4,265,267 | 5/1981 | Cyphelly . |
| 4,387,914 | 6/1983 | Paulson et al. . |
| 4,485,843 | 12/1984 | Wolff . |
| 4,516,553 | 5/1985 | Lindberg . |
| 4,524,947 | 6/1985 | Barnes et al. . |
| 4,706,705 | 11/1987 | Lee, II . |
| 4,825,903 | 5/1989 | Ochs et al. . |
| 4,834,286 | 5/1989 | Sulz . |
| 4,852,608 | 8/1989 | Bennitt . |
| 5,014,884 | 5/1991 | Wunsch ................................. 239/332 X |
| 5,174,332 | 12/1992 | Yokoyama et al. . |
| 5,215,286 | 6/1993 | Kolenc . |
| 5,261,610 | 11/1993 | Waryu et al. . |

FOREIGN PATENT DOCUMENTS 9420750  9/1994  WIPO .

Primary Examiner—Kevin Weldon
Attorney, Agent, or Firm—Wood, Herron & Evans, P.L.L.

[57] ABSTRACT

An airless paint sprayer includes an outlet check valve assembly having a dual spring configuration which allows for increased fluid flow through the valve without diminishing response time of the valve or the priming operations of the system. One of the springs is not engaged when the valve is closed and the other spring has a much lower spring rate and biases the valve toward a closed configuration when the valve is open, closed, and all positions therebetween. The dual spring configuration accommodates highly viscous fluids or paints with maximum fluid flow and no detrimental impact on the priming operations of the sprayer.

19 Claims, 2 Drawing Sheets 5,609,300

AIRLESS PAINT SPRAYER OUTLET CHECK VALVE

This is a continuation-in-part of patent application Ser. No. 08/370,159, filed Jan. 9, 1995.

BACKGROUND OF THE INVENTION

This invention relates to airless paint sprayers, and more particularly, to a mechanism for providing a high flow rate of paint spray in a paint sprayer.

In a typical airless paint sprayer, a piston driven diaphragm pulls the paint from a supply line past a check valve into a paint holding or diaphragm chamber. On piston reversal, the paint in the diaphragm chamber is pressurized. A spray gun has a trigger which, when depressed, opens a valve to allow the pressurized paint in the chamber to flow through an outlet check valve and through a gun nozzle to atomize the paint as it exits an orifice for spraying onto a surface to be coated.

Airless paint sprayers commonly include a suction tube inserted within a can of paint through which the paint is delivered to the diaphragm chamber. Suction is created in the suction tube by a deformable diaphragm which is secured around its perimeter. A central portion of the diaphragm is oscillated, by a piston-driven hydraulic system, for example, between a convex and a concave configuration to thereby pull the paint toward the diaphragm and hence force it outwardly to the spray gun.

In another format, a rotating eccentric cam drives a bearing which in turn drives a piston. The piston is coupled to the diaphragm and the rotation of the cam drives the piston to thereby move the diaphragm to and between the convex and concave configurations. The paint is drawn from the can through the suction tube and inlet valve toward the diaphragm and into the diaphragm chamber to be discharged through the outlet check valve to the spray gun.

Despite past efforts, the use of such systems for spraying paint, for example, have been subject to inconsistent results and unexplained, undesirable variations. For example, a system may not work well with one paint, failing to fully atomize it and "spattering" it onto a surface while operating efficiently with the same paint at another time or in another location. Solutions to these types of problems have been identified as shown in two related applications for U.S. patent Ser. Nos. 08/370,159, filed Jan. 9, 1995 and 08/370,377, filed Jan. 9, 1995, each of which are assigned to the assignee of this invention and are expressly incorporated herein by reference. The inventions of those applications solve certain problems of poor paint sprayer performance.

Other problems which are commonly identified in airless paint sprayers include inconsistent spraying, for example, ineffective spraying of paint of a first type but efficient spraying of paint of a second type. Several possible causes of problems of this type have been proposed such as lack of consistent priming, paint buildup, clogged filters, paint viscosity variation resulting in flow rate variations, humidity, etc. Specifically, a lower flow rate of the paint through the sprayer occurs when a higher viscosity paint is sprayed even when the filters are clean and the flow path of the paint is unclogged. Paint viscosities typically range from about $3.8 \times 10^{-4}$ ft$^2$/sec to about $1.5 \times 10^{-2}$ ft$^2$/sec. The viscosity of water is even less, about $1.07 \times 10^{-5}$ ft$^2$/sec. The inventions of applications Ser. Nos. 08/370,159 and 08/370,377 improve the performance of airless paint sprayers, but the variations in flow rate of higher viscosity paints and fluids as compared to lower viscosity paints and fluids prevent uniform performance. For example, flow rates of higher viscosity paints can be about 25% lower than the flow rate for less viscous paints and fluids.

Accordingly, the effective and consistent use of an airless paint system appears to be a sometimes thing dependent on flow rates resulting from the viscosity of the specific paint or fluid used in the system.

Therefore, it is apparent that there is a need for an airless paint sprayer which does not exhibit significant flow rate variations or loss of pressure, while spraying, due to the viscosity variations of fluids pumped and can reliably, efficiently and effectively spray all types of paint having a wide range of parameters, including viscosity, without the above identified problems and inconsistencies.

While the lower viscosity paints and fluids are relatively easy to handle and consistently pump at desired flow rates, use of the same valving and pumping structures for higher viscosity fluids runs into problems as a result of the more viscous fluids. The same pump and valve structure which works well with lower viscosity fluids does not work well with the higher viscosity fluids in the anticipated viscosity ranges of all paints intended for spraying.

It has thus been one objective of the invention to provide an improved airless sprayer capable of producing consistent spraying results for all anticipated paint viscosities.

It has been another objective of this invention to provide an improved airless paint sprayer which has a consistently high flow rate and does not loose pressure while spraying.

It has been a further objective of this invention to provide such a paint sprayer which can be efficiently and effectively used with a variety of paint types without loosing flow rate or pressure while spraying regardless of normally anticipated variations in paint viscosities.

It has been a still further objective of this invention to provide such a paint sprayer which can be used with a variety of paints and fluid viscosities to consistently atomize and spray the paint in a desired homogeneous pattern.

SUMMARY Of THE INVENTION

To these ends, a preferred embodiment of the invention contemplates the use of an improved outlet check valve on the outlet side of the paint sprayer pump, which produces consistent output flow rates for a wide viscosity range of fluids. In a still further preferred embodiment, a dual spring outlet check valve is used in the outlet of the paint from the diaphragm. The outlet check valve opens and closes quickly for viscous fluids which would otherwise inhibit the quick operation of the valve.

One aspect of the invention is the realization that the response of the outlet check valve is responsible for inconsistent paint spraying performance and reduced flow rate with higher viscosity fluids. According to the invention, that problem is the inability of the system to provide adequate response for starting and stopping the paint flow from the pump to the nozzle or spray gun of the spraying apparatus for a wide variety of paint viscosities.

Typically paint is sucked up from a paint container through a suction tube and into the pumping chamber. The pumping chamber includes a diaphragm which creates a pressure drop in the chamber to draw in the paint and it does so by virtue of its eccentric drive or by the piston-driven hydraulic drive. Once the paint is drawn into the chamber, it is pumped through the outlet check valve when the outlet check valve is actuated toward an open configuration. The paint flows through the open valve to the nozzle for spraying. The nature of the diaphragm is cyclical; the diaphragm constantly accelerates and decelerates through each sucking and pressurization cycle.

For example, the diaphragm moves to enlarge the chamber for sucking paint up the supply tube and into the chamber. Thereafter, the diaphragm is accelerated into the chamber to open the outlet check valve and pump out the paint therein through the open outlet check valve. Once this stroke ends, the diaphragm accelerates in a reverse direction, closing the outlet valve and opening an inlet check valve to suck paint up from the tube. This is the cyclical operation of the diaphragm. The paint flow through the system is greatest when the paint drawn into the chamber is completely and efficiently pumped out of the chamber and through the outlet check valve so that on a subsequent cycle the diaphragm can pull more paint from the inlet side of the pump, thereby avoiding the working or pumping of paint which remains in the chamber and did not pass through the outlet check valve on the previous cycle.

Prior to this invention, only about 75% of the maximum potential paint flow was passing through the paint sprayer due to the poor performance of the outlet check valve. For example, a paint sprayer pump capable of operating at a peak flow of about 1.2 gallons per minute (gpm) was only operating at approximately 0.9 gpm flow with more viscous paints. It was discovered that if the response time of the outlet check valve were improved to permit the paint to efficiently flow from the inlet suction tube through the diaphragm chamber and to the nozzle, then the volumetric flow of highly viscous fluids could be increased.

Previously, in pumps with outlet valves optimized for lighter viscosity fluids, the response time of the outlet check valve with highly viscous paints dropped below a minimal acceptable level. The response time of the valve is the time for the valve to return from an open configuration to a closed position, and vice versa. The response time of the valve diminishes with more viscous paint simply because it cannot move to close as quickly in a thicker more viscous medium. One way to increase the response time of the valve was to increase the return spring preload or spring rate. However, increasing the spring preload or rate adversely effects the vacuum and priming operations of the pump which would also reduce the performance of the system.

In one embodiment of the airless paint sprayer, the diaphragm is driven by an eccentric rotating cam. The movement and acceleration of the diaphragm is cyclic and dependent upon the eccentric cam. At the beginning of the pumping operation the acceleration of the diaphragm is low as paint is initially drawn into the pumping chamber by the diaphragm. The spring preload on the outlet check valve should not be too high to inhibit the opening of the check valve at this portion of the cycle. The acceleration of the diaphragm increases during the paint intake or sucking portion of the cycle. Once the sucking is completed, the diaphragm slowly accelerates in the opposite direction to pump the paint out of the chamber. The acceleration of the diaphragm increases during the pumping portion of the cycle until the paint is discharged from the chamber. The outlet check valve must close quickly to prevent drawing the paint already pumped through the outlet valve back into the chamber. The response of known outlet check valves is retarded in highly viscous fluids. A higher spring preload for closing the valve is preferred. The cycle then repeats itself by once again drawing paint into the chamber.

Thus, a spring having a spring rate sufficiently high to accommodate the resistive forces of higher viscosity paints and to provide a sufficiently fast return to close the valve as required adversely affects the initial opening of the valve at the start of the pumping cycle. Thus, the spring preload of the valve in the closed position can not merely be increased to avoid detrimentally affecting the performance of the system.

The outlet check valve of the present invention includes dual springs which in combination provide for sufficient response time of the valve to maintain system performance for paint over a range of viscosities without increased wear to the components or damage to the priming of the system. The outlet check valve spring assembly of a presently preferred embodiment includes a primary spring having a high spring rate, approximately 35 lbf/in (pound force per inch) and a secondary spring having a much lower spring rate, approximately 1 lbf/in. The secondary spring is always engaged with the outlet check valve and maintains the priming performance of the system because it has a low spring rate. The primary spring is disengaged when the valve is closed. When the valve is opened the primary spring is engaged and it provides a sufficiently high spring rate to yield a fast response time for the valve. As a result, the dual spring outlet check valve does not alter the priming operation of the system but provides a response time to close the valve in higher viscosity fluids to empty the diaphragm chamber and avoid re-pumping a portion of the paint and thereby increase the fluid flow of the sprayer.

The primary spring permits an increased response time of the valve due to its high spring rate. The secondary spring maintains a low preload during priming operations and during initial part of each pump cycle, allowing the outlet valve to initially open at a desired point. The primary spring provides no preload during priming or initial pump cycle operation, but provides the majority if not all of the load on the valve during normal operation as the diaphragm is accelerated for pumping. The dual spring configuration of the outlet check valve of this invention avoids the re-pumping of the paint in the chamber and the problems associated therewith in an airless sprayer by permitting greater fluid flow through the outlet check valve. The dual spring facilitates the greater flow without the disadvantage of loss of system priming performance.

BRIEF DESCRIPTION OF THE FIGURES

The objectives and features of this invention will become more readily apparent from the following detailed description taken in conjunction with the accompanying drawings in which.

DETAILED DESCRIPTION OF THE INVENTION

Figure 1:
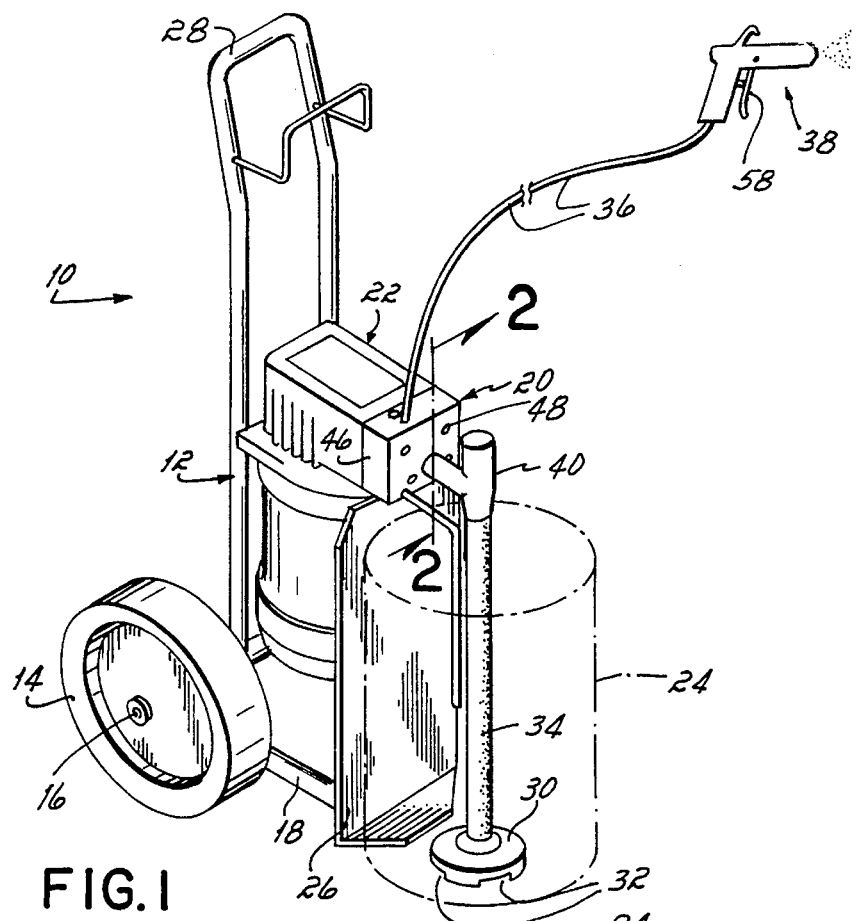
FIG. 1 is a perspective view of an airless paint sprayer according to a presently preferred embodiment of this invention.

An airless paint sprayer 10 as shown in FIG. 1 includes a mobile hand cart 12 supported on the ground by wheels 14 mounted upon an axle 16 for rotation, The hand cart 12 includes a frame 18 to support a pump 20 and a motor 22 which draws paint from a can 24 or other receptacle mounted on a generally L-shaped carriage 26 secured to a lower portion of the frame 18. The paint sprayer 10 can be moved about by grasping an upper generally U-shaped handle 28 and tilting the unit backwards to thereby raise the carriage 26 and paint can 24 supported thereon upwardly to balance the sprayer 10 upon the wheels 14. Other structure for carrying the pump and motor 20, 22 and for supporting them with a paint container or spray liquid container can be used.

In operation, the paint is drawn from the can 24 through a generally cup-shaped intake 30 having a plurality of cut-outs 32 through which the paint enters the intake 30 supported on a bottom wall of the can 24. The paint is drawn from the can 24 through the intake 30 and into a suction tube 34. The paint flows through the suction tube 34 and into the pump 20 for pressurized delivery to a supply line 36 and spray gun 38 through which the pressurized paint is sprayed out of the spray gun 38 in the direction of a surface to be coated. The route of the paint from the can 24 through the pump 20 and to the spray gun 38 is identified as a paint path P throughout the figures and description herein.

Attached to the upper end of the suction tube 34 is a generally T-shaped fitting 40. The T-shaped fitting 40 is disclosed in application Ser. No. 08/370,159, which is hereby incorporated by reference.

Figure 2:
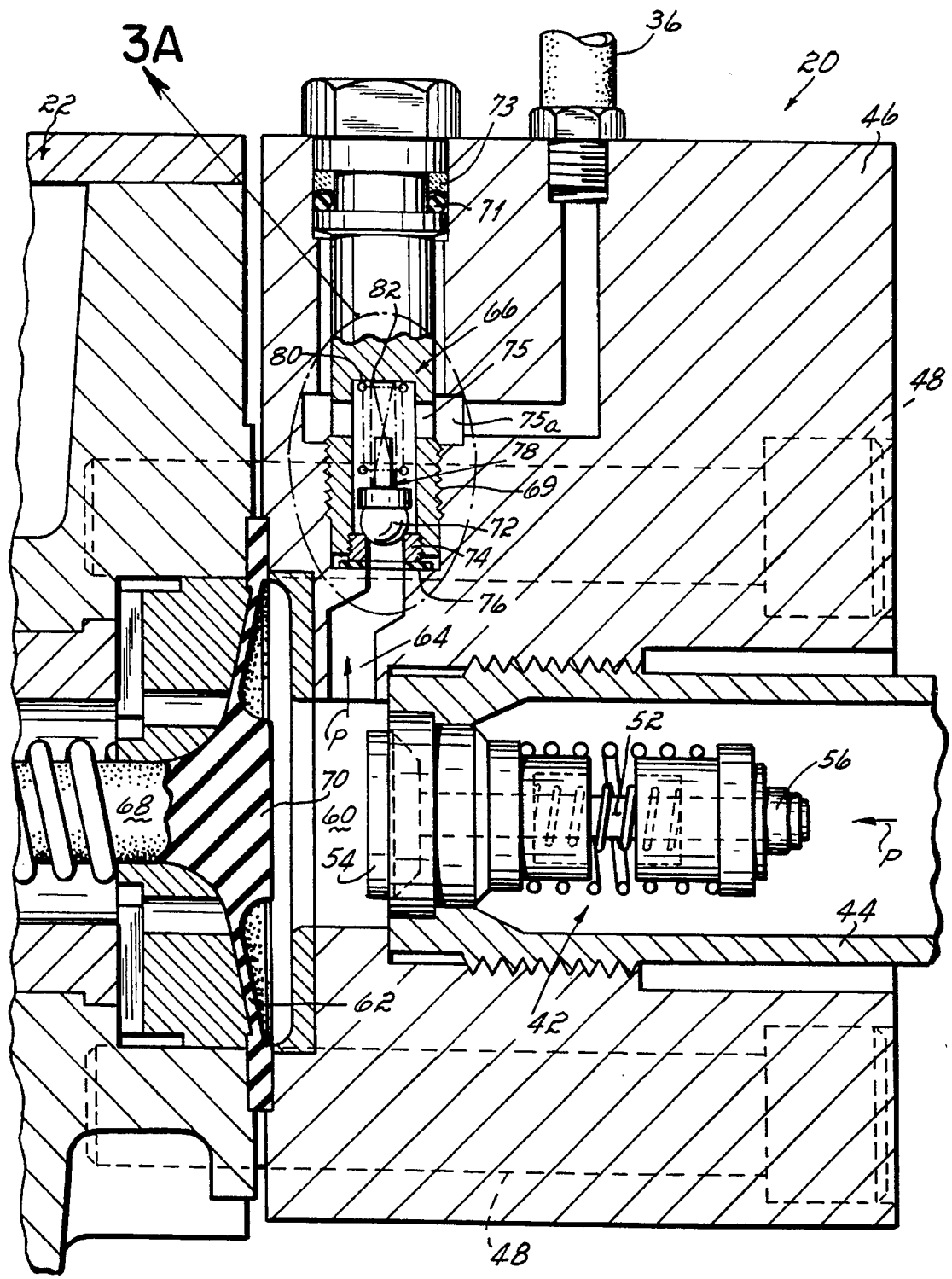
FIG. 2 is a partial cross-sectional view along line 2—2 of FIG. 1 showing an outlet check valve according to a presently preferred embodiment of this invention.

The fitting 40 is connected to an inlet valve assembly 42 (FIG. 2) by a coupling 44 or other appropriate mechanism as known in the art. A presently preferred embodiment of inlet valve assembly 42 is disclosed in application Ser. No. 08/370,377, which is hereby incorporated by reference. The inlet valve 42 is mounted to a pump housing 46 of the pump 20. The housing 46 is secured to the pump 20 as shown in FIG. 2 by bolts 48 or other mechanical fasteners. The valve 42 is seated within an end of the coupling 44 mounted in the housing 46 and includes an elongated valve stem 52 projecting axially within the inlet check valve 42, and having a disk-shaped valve head 54 secured on one end opposite from another end 56 thereof. The inlet check valve 50 translates between open and closed positions to permit the flow of paint to the hose 36 and spray gun 38 upon actuation by a trigger 58 or other appropriate mechanism as is well known by those of ordinary skill in the art.

The inlet valve 42 is positioned proximate a diaphragm chamber or pumping chamber 60 and is spaced from a deformable diaphragm 62. The diaphragm 62 is secured around its perimeter so that a central portion of the diaphragm 62 can oscillate between convex and concave configurations. As it is pulled to the left as viewed in FIG. 2, it pulls the paint through the coupling 44 and the open inlet check valve 42 toward the diaphragm 62. As it moves to the right, it pressurizes chamber 60 and pumps paint through an outlet 64 having a check valve 66 and to the spray tube 36 and spray gun 38. The deformable diaphragm 62 has a stem 68 secured to a central portion 70. The stem 68 is driven indirectly from a piston and eccentric cam (not shown) as is well known in airless paint sprayers of the type described above. The outlet valve 66 includes a valve body 67 which is threadably secured to the pump 20 by meshing threads 69. The valve body 67 has an O-ring 71 and a back-up ring 73 to provide a sealing interface between the body 67 and the pump 20 so that paint flows in the path P through outlet ports 75 of body 67 to an annular outlet 75a in the housing 46 to the supply line 36.

Figures 3A, 3B:
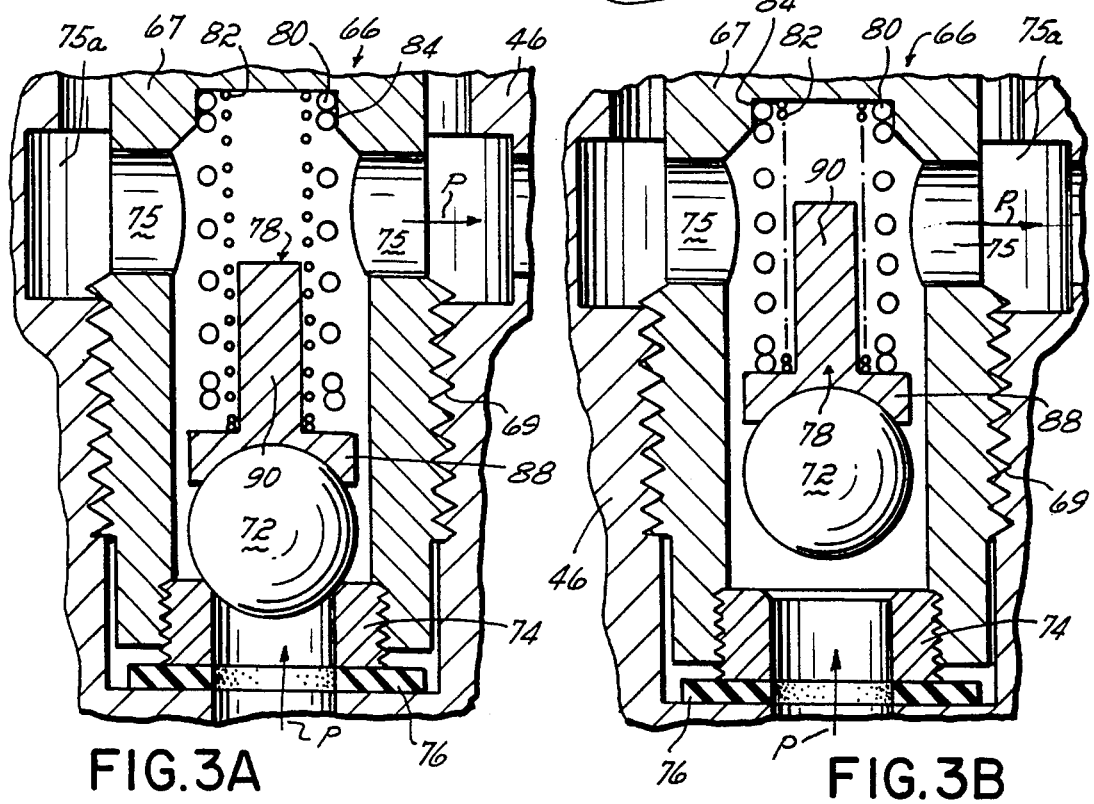
FIG. 3A is an enlarged cross-sectional view of area 3A of FIG. 2 showing the outlet check valve in a closed configuration.
FIG. 3B is a view similar to FIG. 3A with the outlet check valve in an open configuration.

As best seen in FIG. 3A, the outlet check valve 66 is biased to a closed position in which a valve ball 72 is in sealing contact with an annular valve seat 74. The seat 74 is juxtaposed to a washer 76. The outlet check valve 66 is shown in FIGS. 3A and 3B in closed and open positions, respectively. The valve ball 72 is spaced from the valve seat 74 in the open configuration of FIG. 3B. The ball 72 is held in contact with a T-shaped ball retainer 78 in both the open and closed configurations.

The valve 66 includes a pair of nested coil compression springs 80 and 82. The valve 66 is biased toward the closed position by the coil compression spring 82 according to a presently preferred embodiment of this invention. The springs 80 and 82 are mounted between a socket 84 in the valve body 67 and a crossbar 88 of the ball retainer 78. The opposing end coils of the primary spring 80 are seated on the crossbar retainer 88 and on the socket 84 with the valve 66 open as shown in FIG. 3B. The opposing end coils of the secondary spring 82 are seated on the crossbar 88 and socket 84 with the valve open (FIG. 3B) or closed (FIG. 3A) and all positions in between. A stem 90 of the retainer 78 projects through the center of the springs 80 and 82. The secondary spring 82 is preloaded to a partially compressed configuration (FIG. 3A) thereby urging the retainer 78 and the ball 72 into sealing contact with the valve seat 74 and biasing the valve 66 into a closed configuration.

The secondary spring 82 is nested within the primary spring 80 and around the stem 90. According to this invention, the primary spring 80 preferably does not contribute to the preload of the valve 66 in the closed configuration. The primary spring 80 is preferably offset from the crossbar 78 or the socket 84 or both a total of about 0.020 inches in a preferred embodiment so that it is not compressed while the valve 66 is in the closed configuration. As a result, the primary spring 80 does not affect the priming of the system and the outlet valve 66 opens easily, and then during higher accelerations of the diaphragm 70 the primary spring 80 is engaged to bias the valve 66 closed.

According to a presently preferred embodiment of this invention, the primary spring 80 has a relatively high spring rate and the secondary spring 82 has a significantly lower spring rate. In one embodiment of an airless paint sprayer 10 according to this invention, the primary spring 80 has a rate of approximately 35 lbf/in and the secondary spring 82 has a rate of 1 lbf/in. The secondary spring 82 maintains engagement with both the socket 84 and the crossbar 78 and thereby remains in at least a partially compressed configuration. The relatively low spring rate of the secondary spring 84 is easily accommodated during priming of the system and reduces sensitivity to valve wear and dimensional variation of the outlet check valve 66 components. The primary spring 80 is not engaged in the closed position so the preload of the valve 66 does not exceed that of standard single spring outlet check valve assembly designs. As a result, the outlet check valve 66 according to this invention can be used in many standard airless paint sprayers without detriment to the system, vacuum or priming operations.

During operation of the airless paint sprayer 10, the deformable diaphragm 62 operates to draw paint into the diaphragm chamber 60 with the inlet check valve assembly 42 open. The specific operation of the inlet check valve is described in application Ser. No. 08/370,377.

A low preload on the ball 72 is necessary for the outlet valve 66 to allow for pumping air through the system during priming and to compensate for valve component wear. However, a higher load is required on the ball 72 during operation to enable the valve to quickly close and prevent leakage or back flow of paint from the outlet valve 66 to the diaphragm chamber 60. The outlet valve 66 of this invention provides the required valve opening clearance to allow paint to pass therethrough and has the required response time to close the valve even in thick viscous fluids or paints. The primary spring 80 controls the maximum travel of the ball 72 and retainer 78 and is a function of fluid viscosity. Typical viscosities of paints range from about $3.8 \times 10^{-4}$ ft²/sec to about $1.5 \times 10^{-2}$ ft²/sec as compared to about $1.07 \times 10^{-5}$ ft²/sec for water.

Specifically, for a pump having a peak flow of 1.2 gpm, the maximum fluid flow that can be achieved was raised from about 0.9 gpm to about 1.2 gpm for highly viscous fluids or paints with the outlet valve and the dual spring assembly of this invention. This increased allowable fluid flow was achieved due to the outlet check valve. However, if the valve travel distance is increased, the response time of the valve must be maintained so that the operating performance of the paint sprayer 10 is not diminished. The response time as used herein refers to the elapsed time for the outlet check valve 66 to move between opened and closed positions. Preferably, the outlet check valve 66 should have a response faster than 30 Hz in one preferred embodiment of the airless paint sprayer 10 according to this invention.

The dual spring outlet check valve 66 according to this invention maintains a relatively low preload on the valve 66 in the closed configuration and while priming the system and a much higher load when the valve 66 is in the open position. In one preferred embodiment of an airless paint sprayer according to this invention, the optimum travel distance for the ball from open to closed positions, and vice versa, is approximately 0.048 inches. This value will change based upon valve size, component geometry, maximum spring rates, and other paint sprayer parameters. A greater travel distance may cause low flow rate due to inadequate valve response time and a smaller travel distance may result in excess restriction of the valve 66 and lead to back pressure. In a preferred embodiment, the retainer 78 and ball 72 travel about 0.02 inches from the closed piston before the primary spring 80 is engaged.

As a result of the dual spring outlet check valve 66 according to this invention, the fluid flow can be increased through the system without detrimental effects on the priming and performance of the system.

It will be appreciated that although the dual spring outlet check valve assembly is shown and described herein, that the primary spring feature can be used alone to provide increased fluid flow in viscous fluids without affecting the priming or performance of the sprayer 10. For example, the secondary spring may be replaced with another means or device to provide a low preload on the valve 66 and bias the valve 66 closed such as other spring types, gravity, hydraulic force means, air pressure means or the like known to one of ordinary skill in the art. Furthermore, the present invention can be used in combination with the inventions disclosed in applications Ser. Nos. 08/370,159 and 08/370,377 for increased advantages by avoiding more of the problems of cavitation and reduced fluid flow than use of the inventions individually.

From the above disclosure of the general principles of the present invention and a preceding detailed description of a preferred embodiment, those skilled in the art will readily comprehend the various modifications to which the present invention is susceptible. For example, the invention has been shown and described herein with reference to an exemplary diaphragm paint sprayer, but could readily be used in piston pump paint sprayers or other systems. Therefore, I desire to be limited only by the scope of the following claims and equivalents thereof.

I claim:

1. A sprayer for spraying fluids of varying viscosities from a receptacle comprising:

a suction tube having a first end inserted into the fluid within the receptacle;

a pump operatively connected to a second end of said suction tube;

an outlet check valve operatively connected to said pump; and a nozzle operatively connected to said outlet check valve such that during operation of the sprayer said pump draws the fluid from the receptacle through said suction tube and pumps the fluid through said outlet check valve and to said nozzle for spraying;

said outlet check valve regulating flow of said fluid to said nozzle and being biased toward a closed position, said outlet check valve further comprising a first spring which engages said outlet check valve when in an open position to bias said outlet check valve toward said closed position, said outlet check valve being biased toward said closed position when in said open position with a greater force than when said outlet check valve is in said closed position.

2. The sprayer of claim 1 wherein said outlet check valve further comprises:

a second spring which engages said outlet check valve in said closed position to bias said outlet check valve toward said closed position.

3. The sprayer of claim 2 wherein said first spring has a spring rate greater than a spring rate of said second spring.

4. The sprayer of claim 2 wherein said first and second springs are each coil compression springs.

5. The sprayer of claim 2 wherein said second spring is nested within said first spring and said first and second springs have a common axis.

6. The sprayer of claim 1 wherein said first spring does not bias said outlet check valve toward said closed position when said outlet check valve is in said closed position.

7. The sprayer of claim 2 wherein said second spring engages said outlet check valve in said open and closed positions and intermediate positions between said open and closed positions.

8. The sprayer of claim 1 further comprising:

means for biasing said outlet check valve toward said closed position when said outlet check valve is in said closed position.

9. The sprayer of claim 8 wherein said first spring does not always bias said outlet check valve toward said closed position when said outlet check valve is in said open position and said biasing means always biases said outlet check valve toward said closed position.

10. An outlet for a pump of an airless paint sprayer having a suction tube supplying paint from a paint source through the pump to a spray nozzle, the outlet comprising:

a valve being biased toward a closed position to prevent paint from flowing through the outlet, paint being permitted to flow through the outlet when said valve is in an open position; and a first spring engaging said valve in said open position and biasing said valve toward said closed position, wherein said valve is biased toward said closed position when in said open position at a greater rate than when said outlet check valve is in said closed position.

11. The outlet of claim 10 further comprising:
a second spring engaging said valve in said open position and biasing said valve toward said closed position.

12. The outlet of claim 11 wherein said first spring has a spring rate greater than a spring rate of said second spring.

13. The outlet of claim 11 wherein said first and second springs are each coil compression springs.

14. The outlet of claim 11 wherein said second spring is nested within said first spring and said first and second springs have a common axis.

15. The outlet of claim 10 wherein said first spring does not engage said valve when in said closed position.

16. The outlet of claim 11 wherein said second spring engages said valve in said open and closed positions and all positions therebetween.

17. An airless sprayer having a pumping chamber, an outlet check valve and a spray liquid path operably connected between said outlet check valve and an outlet of spray liquid, the improvement comprising:
a spring assembly on said outlet check valve to permit sufficient flow of the spray liquid when said outlet check valve is in an opened configuration for spray liquid to flow therethrough, said spring assembly providing a greater spring force to bias said outlet check valve toward a closed configuration when said outlet check valve is in said open configuration than when said outlet check valve is in said closed configuration.

18. An airless sprayer having a pumping chamber, an outlet check valve and a spray liquid path operably connected between said outlet check valve and an outlet of spray liquid, the improvement comprising:
a dual spring assembly on said outlet check valve, said dual springs combining to provide greater spring force to close said outlet check valve when said outlet check valve is in an open configuration than a closed configuration.

19. The sprayer of claim 18 wherein one of said springs is not engaged when said outlet check valve is in a closed position.

* * * * *